United States Patent
Lu et al.

(10) Patent No.: US 7,409,746 B2
(45) Date of Patent: Aug. 12, 2008

(54) SWIVEL HINGE

(75) Inventors: Sheng-Nan Lu, Shulin (TW); Chia-Ko Chung, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 310 days.

(21) Appl. No.: 11/382,677

(22) Filed: May 10, 2006

(65) Prior Publication Data

US 2007/0261206 A1  Nov. 15, 2007

(51) Int. Cl.
*E05D 3/10* (2006.01)

(52) U.S. Cl. .................. 16/367; 16/337; 379/433.13

(58) Field of Classification Search ............... 16/366, 16/367, 302, 337, 338, 340; 379/433.13, 379/433.12
See application file for complete search history.

(56) References Cited

U.S. PATENT DOCUMENTS

| | | | | |
|---|---|---|---|---|
| 6,378,830 B1 * | 4/2002 | Lu | ............... | 248/278.1 |
| 6,845,546 B1 * | 1/2005 | Lu et al. | ............... | 16/367 |
| 6,883,206 B2 * | 4/2005 | Yang et al. | ............... | 16/337 |
| 7,017,235 B2 * | 3/2006 | Lu et al. | ............... | 16/367 |
| 7,024,729 B2 * | 4/2006 | Chang et al. | ............... | 16/367 |
| 7,055,218 B2 * | 6/2006 | Lu et al. | ............... | 16/367 |
| 7,096,540 B2 * | 8/2006 | Watanabe et al. | ............... | 16/367 |
| 7,327,561 B2 * | 2/2008 | Chen | ............... | 361/681 |
| 7,336,782 B2 * | 2/2008 | Watanabe et al. | ............... | 379/433.13 |
| 2004/0231105 A1 * | 11/2004 | Ahn | ............... | 16/367 |
| 2005/0060843 A1 * | 3/2005 | Hung | ............... | 16/367 |
| 2005/0076474 A1 * | 4/2005 | Lu et al. | ............... | 16/280 |
| 2005/0079897 A1 * | 4/2005 | Nishijima et al. | ............... | 455/575.1 |
| 2005/0283949 A1 * | 12/2005 | Lu et al. | ............... | 16/367 |
| 2006/0021195 A1 * | 2/2006 | Yamada et al. | ............... | 16/367 |

* cited by examiner

*Primary Examiner*—Victor Batson
*Assistant Examiner*—Jeffrey O'Brien
(74) *Attorney, Agent, or Firm*—patenttm.us

(57) ABSTRACT

A swivel hinge has a base plate, a first loop, a first rotating board, a second loop, a mounting member, a second rotating board, a pivot member, a third loop, a third rotating board, and a locking ring. When the display panel rotates relative to the main board in a same plane, the third rotating board will not rotate, only the first and second rotating boards rotate relative to the base plate and provide an anchor and limitation function. When a direction of a camera on the display is to be adjusted, the third rotating board rotates with the second rotating board, thus the camera can rotate according to the shooting angle.

5 Claims, 7 Drawing Sheets

US 7,409,746 B2

SWIVEL HINGE

BACKGROUND OF THE INVENTION

1. Field of the Invention

The present invention relates to a swivel hinge, and particularly relates to a swivel hinge applied in cell phone, whereby the display panel and the camera can rotate respectively.

2. Description of the Related Art

Cell phones with cover and base is opened by lifting the cover, sliding the cover and rotating the cover nowadays. The conventional swivel hinge mounted in the cell phone can be pivoted to open the cover relative to the base. However, if the cell phone has a camera on the cover, the camera can not rotate to adjust the shooting direction. An additional hinge may probably solve the problem, but increase the complexity of fabrication and the cost.

Therefore, the invention provides a swivel hinge to mitigate or obviate the aforementioned problems.

SUMMARY OF THE INVENTION

The main objective of the present invention is to provide A swivel hinge having a base plate, a first loop, a first rotating board, a second loop, a mounting member, a second rotating board, a pivot member, a third loop, a third rotating board, and a locking ring.

When the display panel rotates relative to the main board in a same plane, the third rotating board will not rotate, only the first and second rotating boards rotate relative to the base plate and provide an anchor and limitation function. When a direction of a camera on the display is to be adjusted, the third rotating board rotates with the second rotating board, thus the camera can rotate according to the shooting angle.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
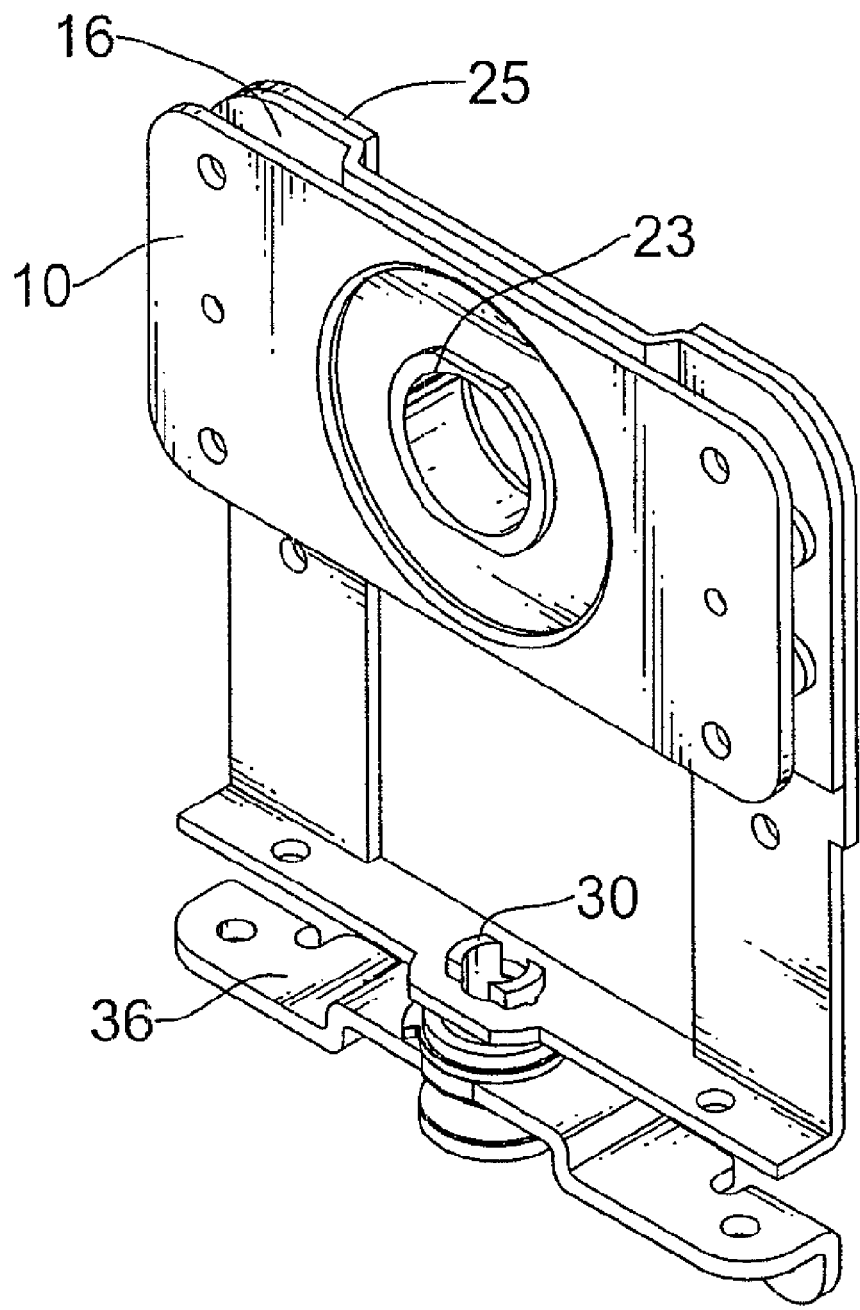
FIG. 1 is a front perspective view of a swivel hinge in accordance with this invention.
Figure 2:
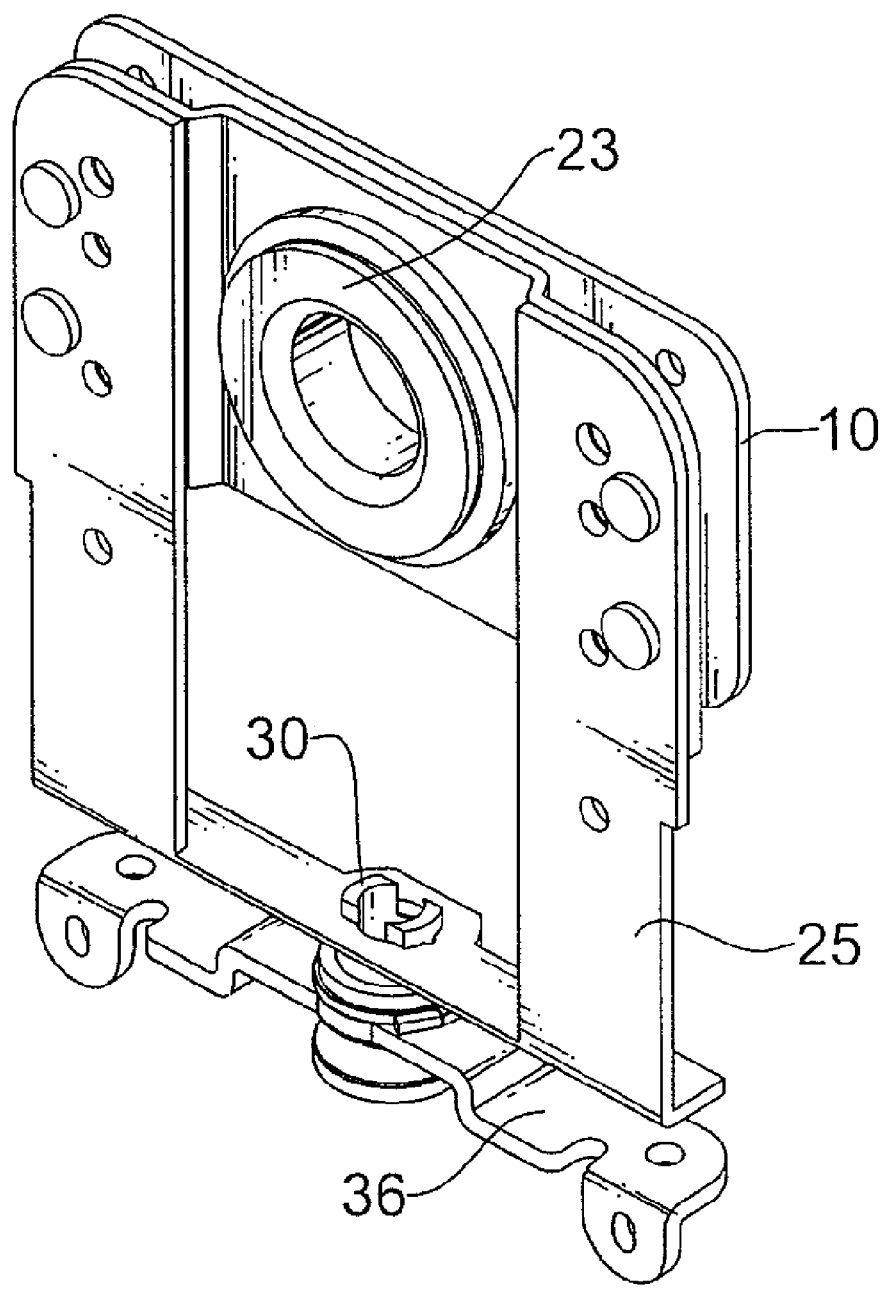
FIG. 2 is a back perspective view of the swivel hinge in FIG. 1.

With reference to FIGS. 1-5, a swivel hinge in accordance with the present invention has a base plate (10). The base plate (10) has a through hole (11), two first flat portion (12) is formed at two opposite inner edges of the through hole (11).

A first loop (13) is mounted adjacent to the base plate (10) and has a first opening (14) defined in a middle of the first loop (13) corresponding to the through hole (11) in the base plate (10). A first limit (15) of 90-degree sector shape is formed on a periphery wall of the first loop (13).

A first rotating board (16) is mounted adjacent to one side of the first loop (13) away from the base plate (10). A first mounting hole (17) is defined in the middle of the first rotating board (16). A first locating lug (18) selectively engaging with the limit (15) is formed at a side of the first rotating board (16) toward the first loop (13). Four locating slots (19) are defined at an inner edge of the first mounting hole (17) in a side of the first rotating board (16) away from the first loop (13).

A second loop (20) is mounted adjacent to the first rotating board (16) away from the first loop (13). A second opening (21) is defined in a middle of the second loop (20) and corresponds to the first opening (14) in the first loop (13). Two locating ribs (22) selectively engaging the locating slots (19) are formed at a side of the second loop (20) toward the rotating board (16).

A mounting member (23) extends through the second loop (20), the first rotating board (16), the first loop (13), and the base plate (10). Two second flat portions (24) are formed at an outside surface of the mounting member (23) and correspond to the first flat portion (12) of the base plate (10). A head of the mounting member (23) is secured to the base plate (10).

A second rotating board (25) is L-shaped in side view, is attached to the first rotating board (16) by multiple connection members (26) in a first end of the second rotating board (25). A second end of the second rotating board (25) has a second mounting hole (27) defined in a middle of the second end of the second rotating board (25). The second mounting hole (27) has a third flat portion formed on an edge of the second mounting hole (27). The connection members (26) are rivets or T-shaped made of soft plastic and fasten the second rotating board (25) on the first rotating board (16).

A pivot member (30) has a first end and a second end. The first end is mounted through the second mounting hole (27) and is secured on the second rotating board (25). The second end has a fourth flat portion (31).

A third loop (32) is mounted on the fourth flat portion (32) of the pivot member (30) and has a third opening (33) with a fifth flat portion (34) corresponding to the fourth flat portion (32). A second limit (35) of a 90-degree sector shape is formed on a periphery wall of third loop (32).

A third rotating board (36) is mounted around the second end of the pivot member (30) and has a third mounting hole (37). A second locating lug (38) is formed adjacent to the third mounting hole (37) on the third rotating board (36) and selectively abuts the second limit (35) of the third loop (32).

Multiple first rings (39) are mounted on the fourth flat portion (31) below the third rotating board (36).

A second ring (41) is mounted on the second flat portion (24) between the mounting member (23) and the second loop (20).

A locking ring (40) is mounted on the fourth flat portion (31) below the second rings (39) to hold the third loop (32), the third rotating board (36), and multiple second rings (39) on the fourth flat portion (31).

When the base plate (10) rotates with the first loop (13), the first limit (15) will be stopped by the first locating lug (18). Therefore, the base plate (10) can rotate no more than 270 degrees relative to the first rotating board (16). The four locating slots (19) are defined respectively in 0, 90, 180, and 270 degrees in the inner edge of the first mounting hole (17). Since the first rotating board (16) rotates with the base plate (10) relative to the second loop (20), the locating ribs (22) of the second loop (20) will selectively engage the opposing locating slots (19). Therefore, the swivel course of base plate (10) has anchor points by the engagement.

The third loop (32) and the third rotating board (36) have the same structure as the first loop (13) and the first rotating board (16), so the rotating limitation method is the same, and the full description of the process is omitted.

Figure 3:
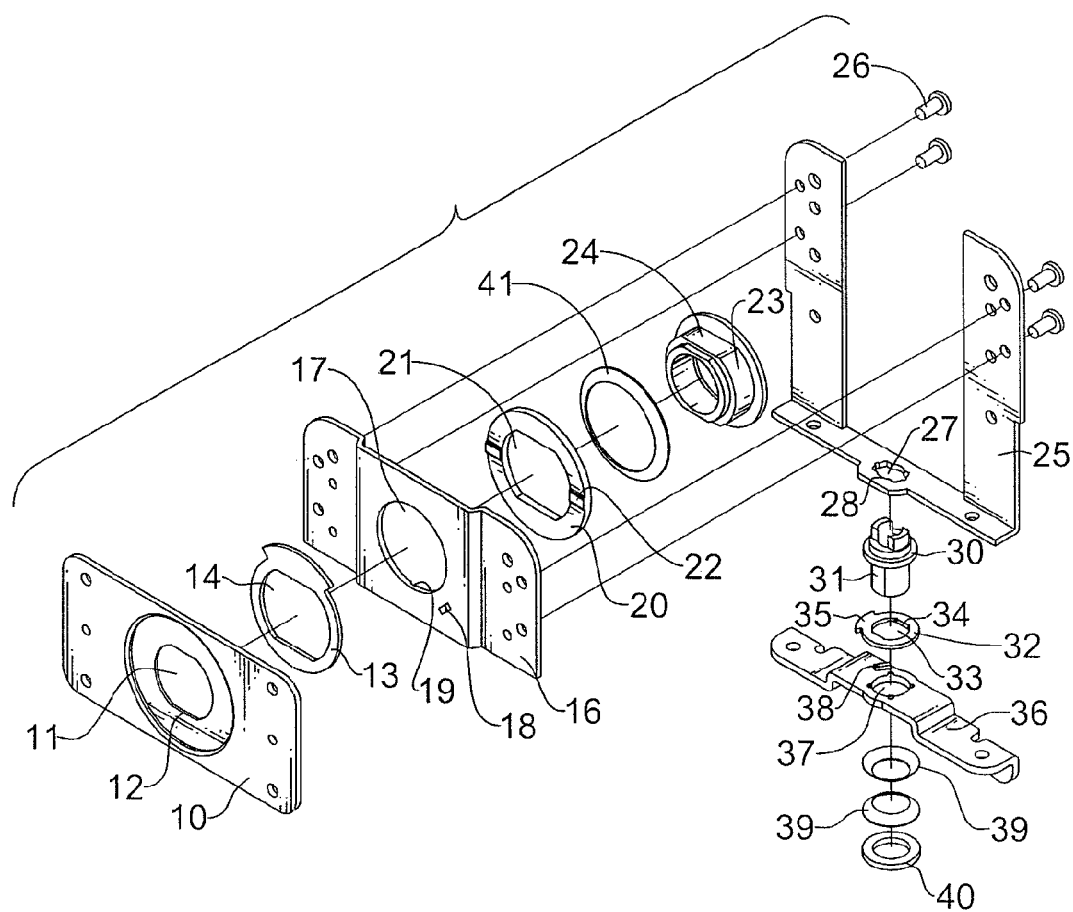
FIG. 3 is a front exploded view of the swivel hinge in FIG. 1.
Figure 4:
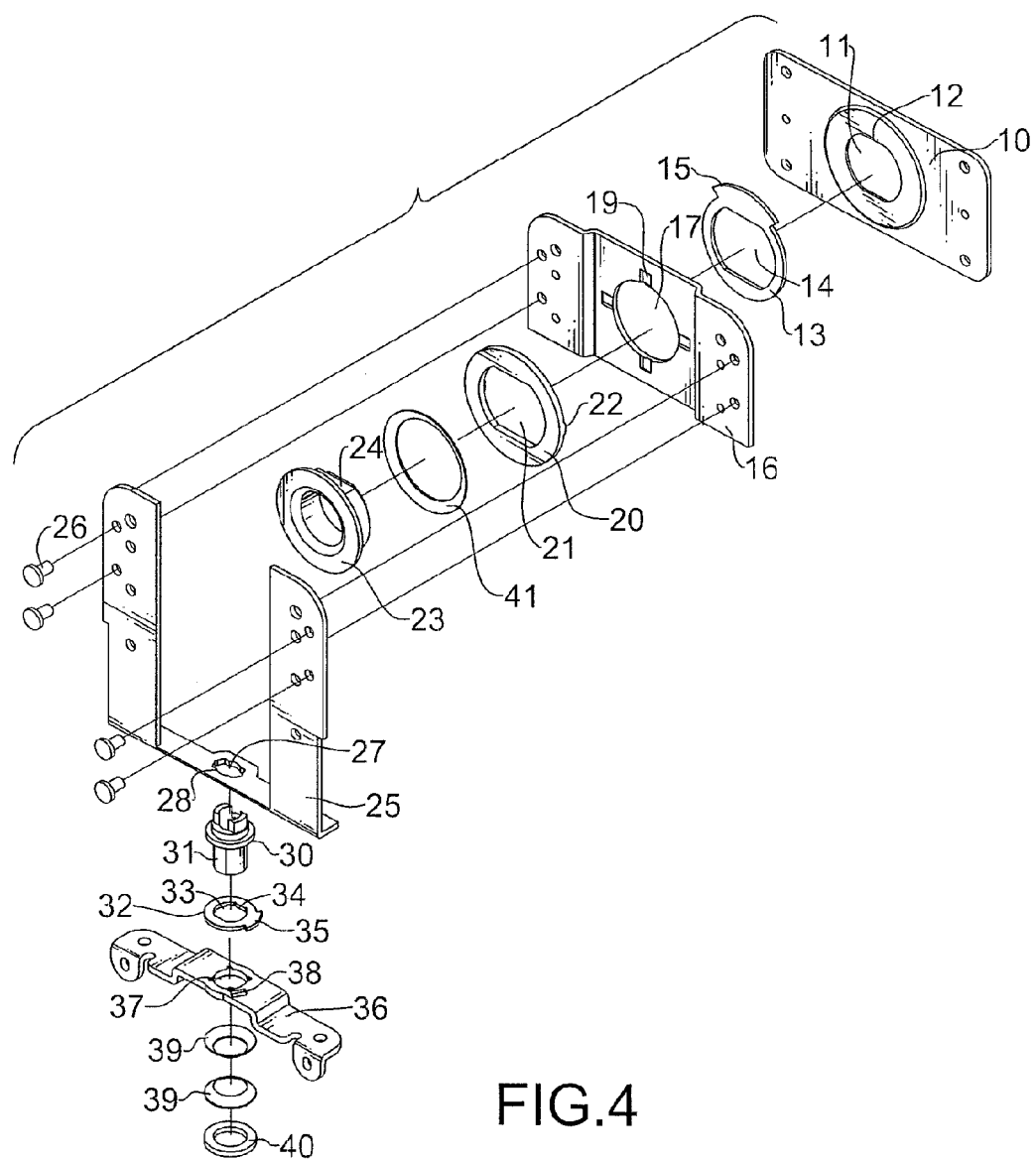
FIG. 4 is a back exploded view of the swivel hinge in FIG. 1.
Figure 5:
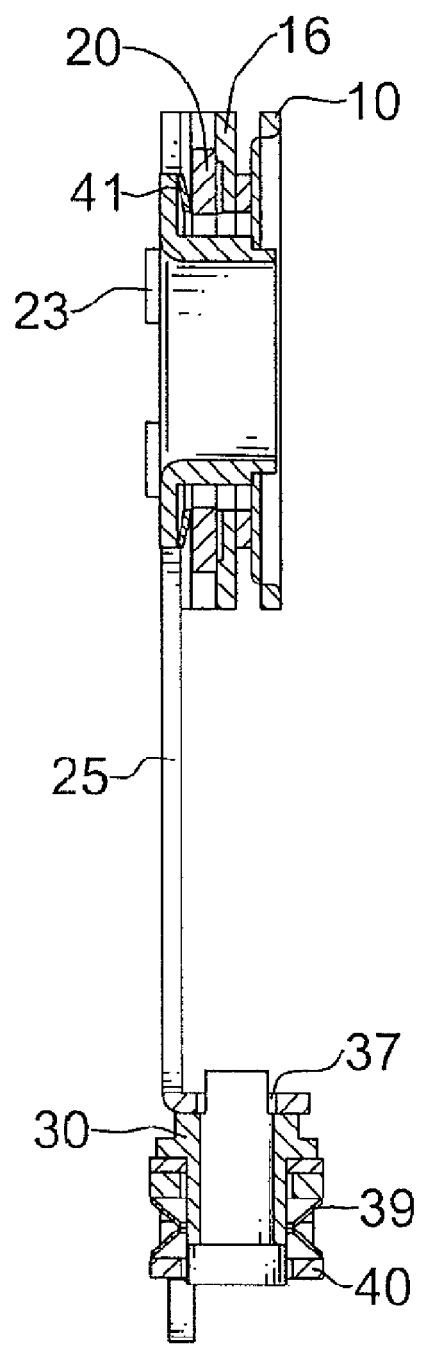
FIG. 5 is a cross sectional side view of the swivel hinge in FIG. 1.
Figure 6:
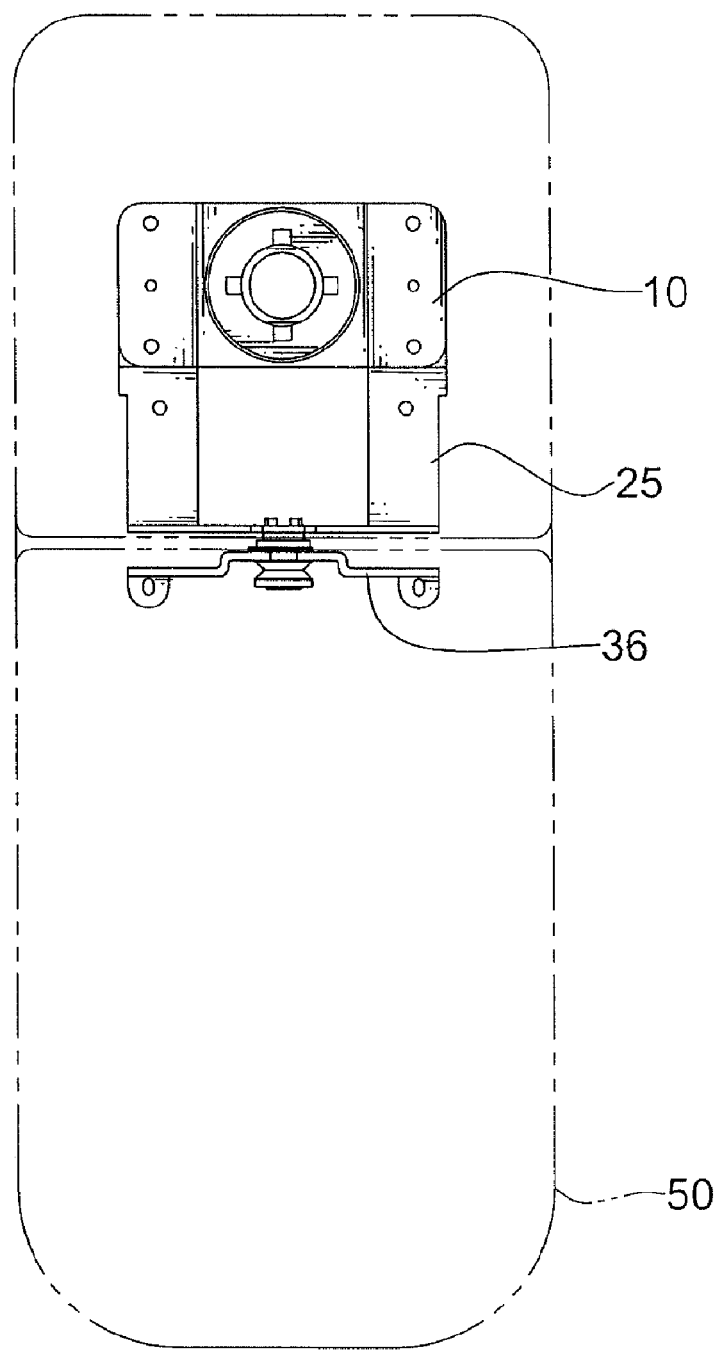
FIG. 6 is a front view of the swivel hinge in FIG. 1 mounted in cell phone when a display panel is closed.
Figure 7:
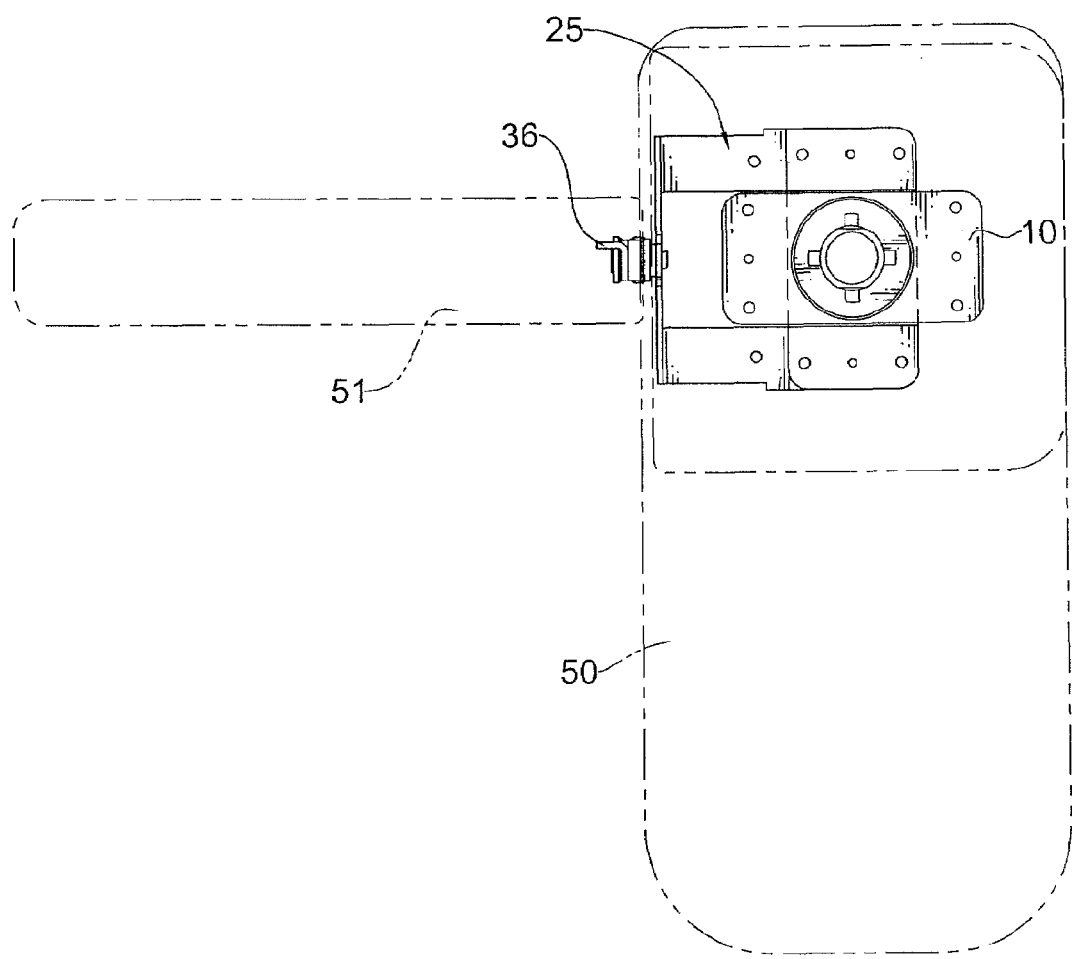
FIG. 7 is an operational front view of the swivel hinge in FIG. 1 mounted in a cell phone when a display panel rotates relative to the main board.

With further reference to FIGS. 3, 6 and 7, it is an illustration of the swivel hinge mounted in a cell phone made of a main board (50) and a display panel (51) separately. The base plate (10) is attached to the main board (50). The second rotating board (25) and the third rotating board (36) are attached to the display panel (51). When the display panel (51) rotates relative to the main board (50) in a same plane, the third rotating board (36) will not rotate, only the first and second rotating boards (16), (25) rotate relative to the base plate (10) and provide an anchor and limitation function. When a camera on the display panel (51) needs to adjust, the third rotating board (36) rotates with the second rotating board (25), thus the camera can rotate to adjust the shooting angle.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A swivel hinge comprising:
   a base plate having a through hole defined through the base plate and two first flat portion formed at two opposite inner edges of through hole;
   a first loop mounted adjacent the base plate and having a first opening defined in a middle of the first loop corresponding to the through hole of the base plate and a first limit of 90-degree sector shape formed on a periphery wall of the first loop;
   a first rotating board mounted adjacent to one side of the first loop away from the base plate, a first mounting hole defined in a middle of the first rotating board, a first locating lug engaging the limit and formed at a side of the first rotating board toward the first loop, four locating slots defined at an inner edge of the first mounting hole in a side of the first rotating board away from the first loop;
   a second loop adjacent to the first rotating board away from the first loop, a second opening defined in a middle of the second loop and corresponding to the first opening, two locating ribs selectively engaging the locating slots and formed at a side of the second loop toward the rotating board;
   a mounting member extending through the second loop, the first rotating board, the first loop, and the base plate, two second flat portion formed at an outside surface of the mounting member and corresponding to the first flat portion of the base plate, and a head of the mounting member riveted to the base plate;
   an L-shaped second rotating board attached to the first rotating board by multiple connection members in a first end of the second rotating board; a second end of the second rotating board having a second mounting hole defined in a middle of the second end of the second rotating board, and the second mounting hole having a third flat portion formed on an edge of the second mounting hole;
   a pivot member having a first end and a second end, the first end mounted through the second mounting hole and mounted on the second rotating board, the second end having a fourth flat portion;
   a third loop mounted on the fourth flat portion of the pivot member, and having a third opening with a fifth flat portion, and a second limit of a 90-degree sector shape formed on a periphery wall of third loop;
   a third rotating board mounted around the second end of the pivot member, and having a third mounting hole, a second locating lug formed adjacent to the third mounting hole on the third rotating board and selectively abutting the second limit of the third loop; and
   a locking ring mounted on the fourth flat portion below the second rings to hold the third loop, the third rotating board, and multiple second rings.

2. The swivel hinge as claimed in claim 1 further comprising multiple first rings mounted on the fourth flat portion below the third rotating board.

3. The swivel hinge as claimed in claim 1 further comprising a second ring mounted on the second flat portion between the mounting member and the second loop.

4. The swivel hinge as claimed in claim 1, wherein the connection members are rivets.

5. The swivel hinge as claimed in claim 1, wherein the connection members are T-shaped made of soft plastic and fasten the second rotating board on the first rotating board.

* * * * *